Aug. 25, 1970   SHINZO EBIHARA   3,525,659
ARTIFICIAL DWARF TREE AND METHOD OF MAKING SAME
Filed Oct. 24, 1966   4 Sheets-Sheet 2
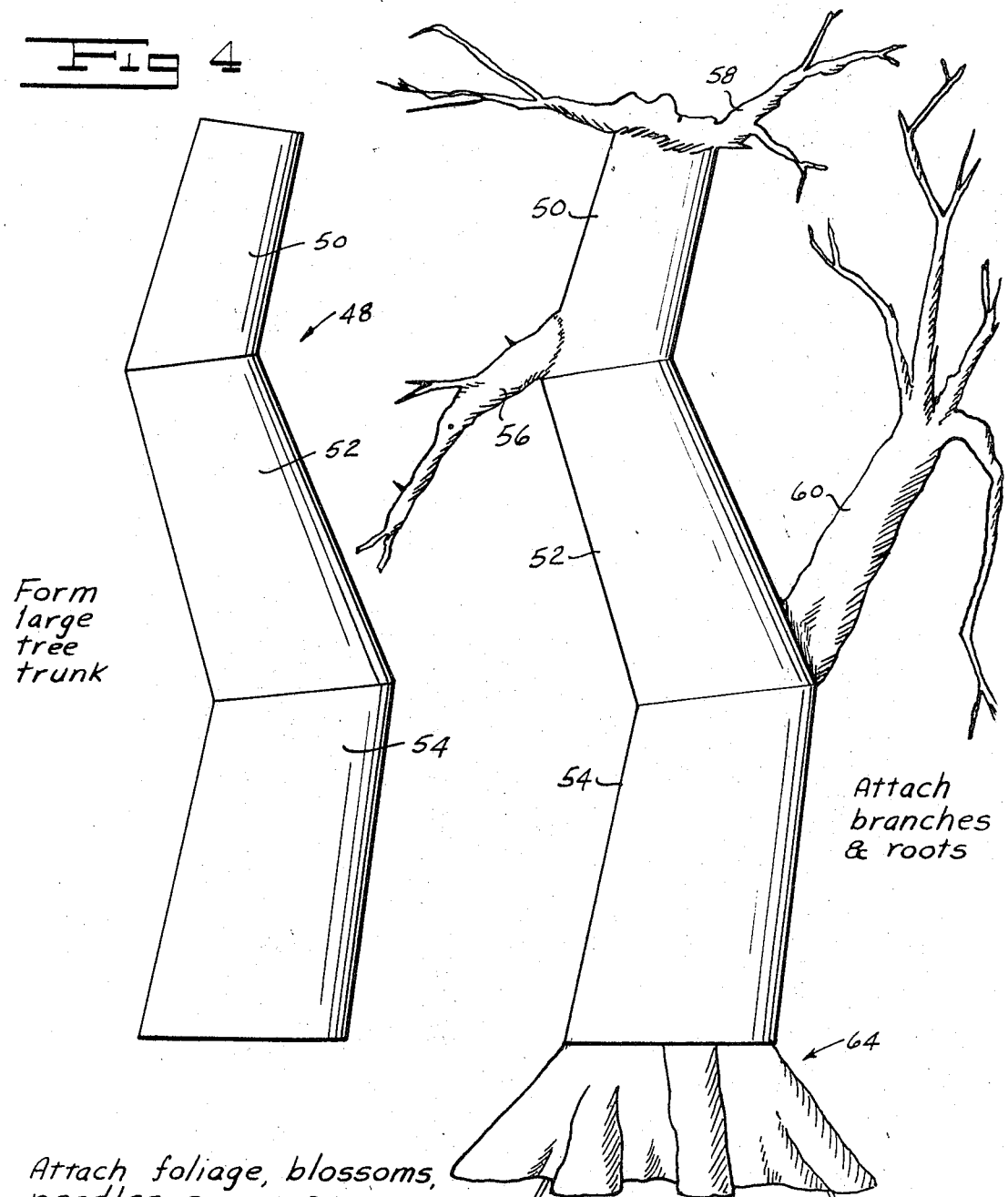
Form large tree trunk
Attach branches & roots
Attach foliage, blossoms, needles, cones or fruit to branches.
INVENTOR.
Shinzo Ebihara
BY 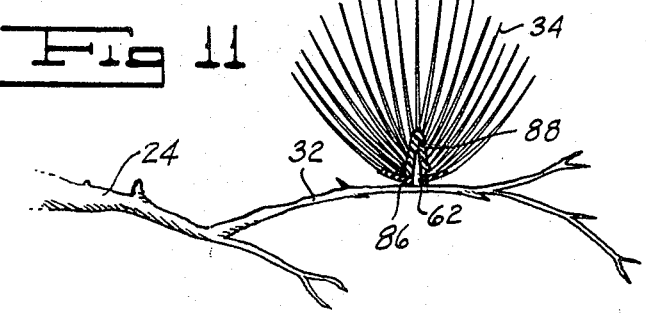
ATTORNEYS

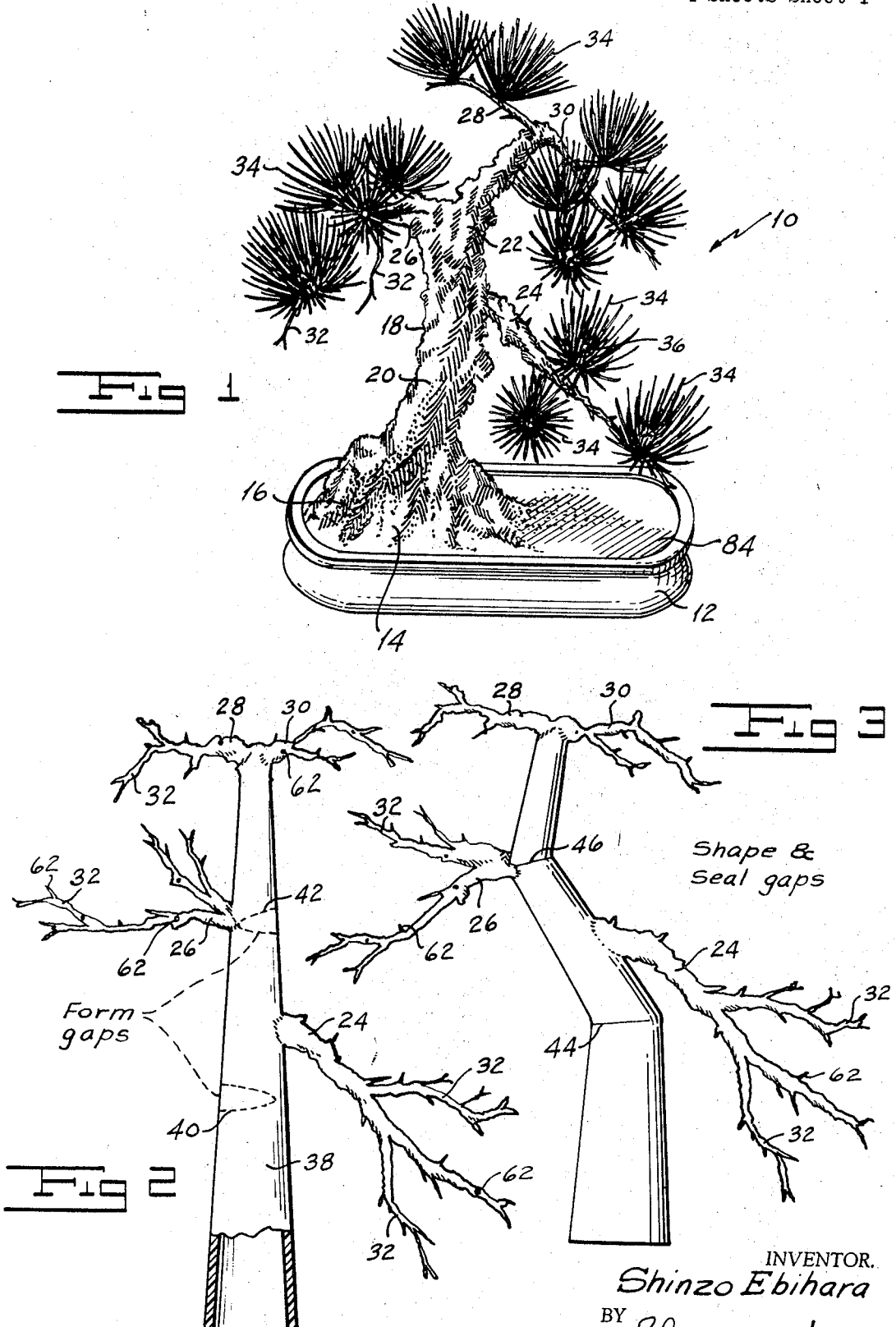

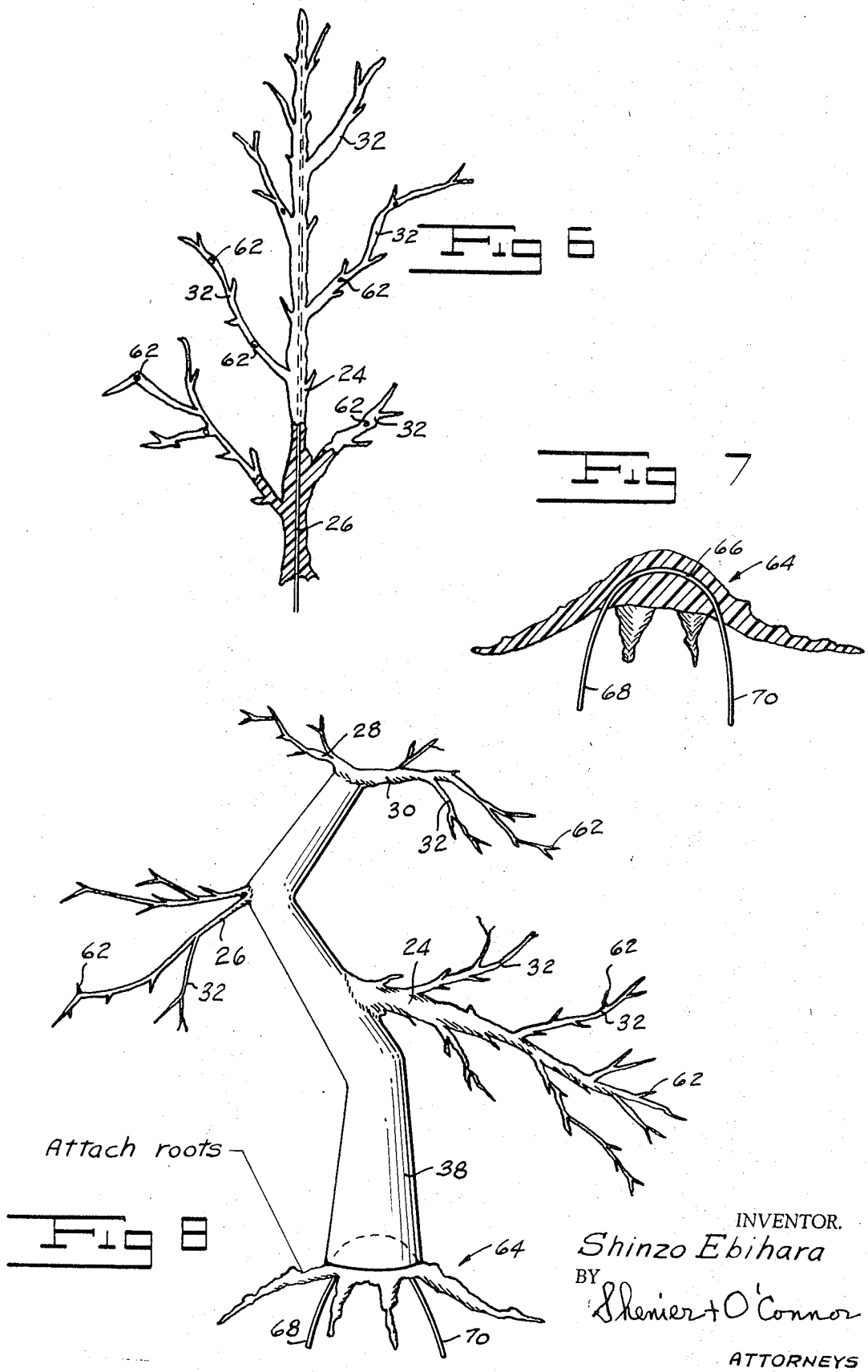

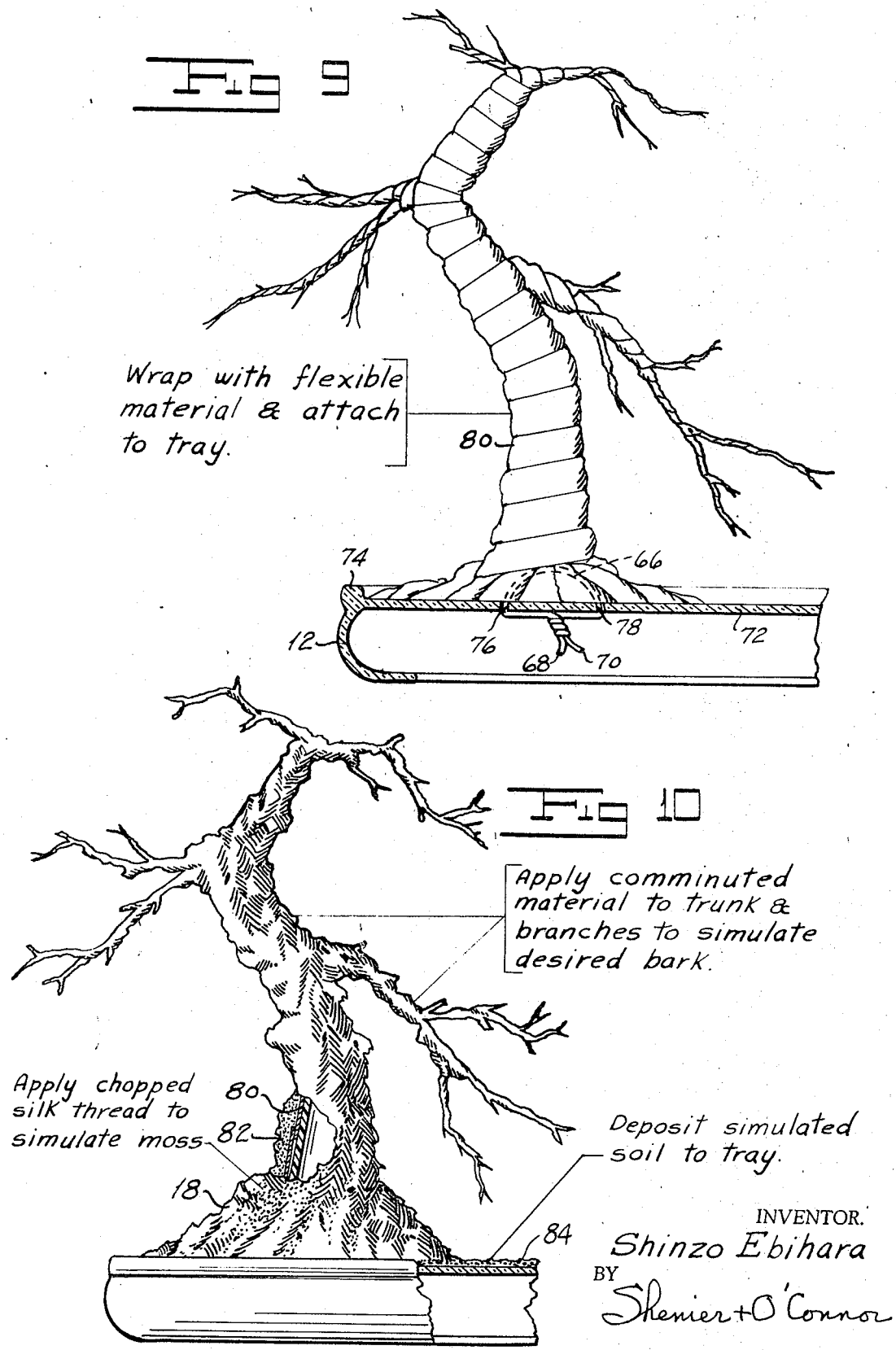

United States Patent Office 3,525,659
Patented Aug. 25, 1970

3,525,659
ARTIFICIAL DWARF TREE AND METHOD OF MAKING SAME
Shinzo Ebihara, 20–11, 3-chome Asakusabashi,
Daito-ku, Tokyo, Japan
Filed Oct. 24, 1966, Ser. No. 588,865
Int. Cl. A47g 33/06
U.S. Cl. 161—22                              10 Claims

ABSTRACT OF THE DISCLOSURE

An artificial dwarf tree and method of making the same in which I attach branches having wire cores and a root structure carrying a wire extending out of the bottom of the root structure to a tree trunk core formed by notching the wall of a generally straight hollow synthetic resin body bending the body to close the notches and heat sealing the wall. The tree is mounted in a tray or the like by passing the root structure wires through holes in the false bottom of the tray. The assembly is wrapped with a fibrous wrapping to permit the application of bark simulating material to the trunk. Foliage or the like is applied to spikes molded on the twigs or branches.

BACKGROUND OF THE INVENTION

The Japanese people for centuries have practiced the art of "bon-sai" which is the cultivation of dwarf trees and potting them for use as ornaments in rooms and the like. By selective pruning and fertilization, the trees are dwarfed and trained to the shape of ancient big trees with their many bends and twisted shapes. Nearly all types of dwarf trees may be cultivated. They may, for example, be fruit trees, flowering trees, coniferous trees, and many others. A particular arrangement may include a number of trees in a tray as a group (yose-uye) or a single tree (bon-sai) of relatively large diameter in various shapes. The tree may be generally erect or it may be leaning. Oftentimes portions of the roots are left exposed to enhance the impression of age of the tree. This art of cultivating live dwarf trees is a difficult one which takes a long period of time. A full grown tree cannot be grown in less than ten years. There are known live dwarf trees which are over two hundred years old.

It is advantageous that artificial dwarf trees be produced in such a way as would permit their sale to the mass market so that many may enjoy their decorative value. It will readily be appreciated however that the trees must be highly individualistic if they are to have a distinctive appearance. In other words, no two trees are alike and the variety of shapes and arrangements is virtually endless. Thus, while it has been possible in the prior art to simulate the appearance of a dwarf tree, achievement of the desired individuality has made the simulations so expensive as to be prohibitive in cost to the ordinary purchaser.

I have invented an artificial dwarf tree and a method of making the same which greatly facilitates the manufacture of a wide variety of highly individualistic dwarf trees. My method permits production of a dwarf artificial tree which very closely simulates the appearance of a natural dwarf tree. It makes possible production of such trees at a cost which puts them within the reach of the general purchasing public. It does not require highly skilled sculptural talents to achieve the desired variety of different shapes.

DESCRIPTION OF THE INVENTION

One object of my invention is to provide an artificial dwarf tree which very closely simulates the appearance of a natural dwarf tree.

Another object of my invention is to provide potted artificial dwarf trees or "bon-sai" which are relatively inexpensive as compared with artificial dwarf trees of the simulated character of the prior art.

A further object of my invention is to provide a method of making individualistic artificial dwarf trees without requiring the services of a highly skilled sculptor.

Yet another object of my invention is to provide a method of making artificial dwarf trees which are readily adapted to a very wide range of shapes, arrangements and varieties of dwarf trees with simple common starting materials.

Other and further objects of my invention will appear from the following description.

In the accompanying drawings which form part of the instant specification and which are to be read in conjunction therewith and in which like reference numerals are used to indicate like parts in the various views:

FIG. 1 is a perspective view of one variety of artificial dwarf tree in a pot or a "bon-sai" produced by my method.

FIG. 2 is an elevation of a trunk core component and branches of one form of my artificial dwarf tree with a part broken away.

FIG. 3 is an elevation of the trunk core and branches shown in FIG. 2 after the core has been shaped pursuant to my method.

FIG. 4 is an elevation of an alternate form of my trunk core of larger diameter for forming a relatively large artificial dwarf tree.

FIG. 5 is an elevation of the form of my artificial dwarf tree trunk core shown in FIG. 4 after branches and a root structure have been attached thereto.

FIG. 6 is an elevation of a branch and twig structure of one form of my artificial dwarf tree with a part broken away.

FIG. 7 is a sectional view of the root simulating structure of one form of my artificial dwarf tree.

FIG. 8 is an elevation of the form of my artificial dwarf tree illustrated in FIG. 3 with the root structure attached thereto.

FIG. 9 is an elevation of the form of my artificial dwarf tree illustrated in FIG. 3 potted to form a "bon-sai" after further steps of my method have been performed.

FIG. 10 is an elevation of the form of my artificial dwarf tree shown in FIG. 1 with parts broken away before the application of foliage thereto potted to form a "bon-sai."

FIG. 11 is a fragmentary view of my artificial dwarf tree with parts in section illustrating the manner in which evergreen needles are attached to the tree branches.

Referring now to FIG. 1 of the drawings I have illustrated one form of artificial dwarf tree produced by my method and indicated generally by the reference character 10. The tree 10 is of a relatively small diameter and in the particular embodiment illustrated happens to be a pine tree. The tree 10 is supported in a relatively shallow receptacle 12 of ceramic material or the like. The tree comprises a root section 14 which may incorporate a number of exposed areas and part of which may be covered with moss simulating material 16. The portion of the tray adjacent the roots may be filled with simulated earth, possibly with regions of moss. The trunk 18 of the tree which is covered with a suitable bark simulating material to be described hereinafter is formed to have a gnarled or twisted shape with a first curve or bend in the region 20 and a second curve or bend in the region 22. Trunk 18 supports a number of branches 24, 26, 28 and 30. Each of the branches may be formed with one or more twigs 32 and any appropriate foliage or needles 34 and cones 36 are applied in a manner to be described.

Referring now to FIGS. 2 and 3, in making a relatively small trunk diameter artificial dwarf tree of the type shown in FIG. 1, for example, I start with a generally straight, hollow trunk core 38 having a number of integrally molded branches such as the branches 24, 26, 28 and 30, each of which may have a plurality of twigs 32. The nature of the branches and twigs will more fully be described hereinafter. Having molded the core 38 I next form gaps, as will be described hereinafter, in the core wall at arbitrary spaced locations therealong, which locations are determined by the locations at which I desire to provide bends and the directions of such bends, such as the bends 20 and 22 along the tree trunk. I have illustrated the gaps in FIG. 2 by the broken lines 40 and 42.

Once I have formed the gaps as indicated by the dotted lines 40 and 42, I then bend the core 38 in directions to close the gaps and then seal the core wall along lines, such as the lines 44 and 46, of the closed gaps, thus to provide the desire bends in the tree trunk 18.

I may form the gaps and perform the sealing operations in a variety of ways which are determined in some degree by the material of which the hollow core 38 is formed. I may for example make the core 38 of a heat-sealable plastic material such as polyethylene or the like. In this case the gaps can be formed in the regions 40 and 42 by use of a hot metal member heated to a temperature of about 230° C. or more. In performing this operation I thrust the heated member through the tube wall to about 80 percent of the wall diameter. I then bend the core in the manner described and I may seal the wall by the application of a heated tool thereto in the areas of lines 44 and 46.

Alternatively to heat sealing, I may use a solvent to seal the wall after the gaps have been closed by bending the core. Moreover, it will readily be appreciated that the gaps may be formed in other ways than by the application of heat as by cutting and the like.

It will be appreciated from the description above that I may form the core from any one of a relatively large number of synthetic resinous materials. For example, I may use polyethylene, polypropylene, nylon or polyvinyl chloride together with a plasticizer to mold the core. With each of these materials heat may be applied to perform the notch-forming and sealing operations. Other materials which might be used are polystyrene and polyacrylic resins. With these two latter materials, however, the use of heat to form the bends is not appropriate. As I have pointed out, alternatively to employing heat to seal the core, I may use a suitable solvent. Where polyvinyl chloride or polyacrylic resins are employed, simple ketone, such as acetone or methyl ethyl ketone may be used as solvents if applied when hot. At room temperatures, stronger solvents such as tetrahydrofuran, cyclohexanone or isophorone may be employed. Other solvents, of course, may be suitable. For polyethylene, generally the same class of solvents as those used for polyvinyl chloride are appropriate but should be used when hot. Nylon is resistant to most common solvents (except alcohol) and the heat sealing method is preferable. The same group of solvents as those mentioned above can be used for polyacrylic resins. Aromatic hydrocarbons are appropriate solvents for polystyrene.

Referring now to FIGS. 4 and 5 I have shown the manner in which I form the trunk core indicated generally by the reference character 48 of a dwarf tree having a relatively thick trunk. This core 48 is formed by joining a plurality of generally straight hollow core sections 50, 52 and 54, with the axes of the sections making desired angles corresponding to the tree bends. It will readily be understood that the individual sections required to form the core 48 may be cut from a single straight molded piece. The sections may then be joined by any appropriate means as, for example, by heat-sealing or by the use of a suitable solvent depending upon the particular synthetic resin used which may be selected from the group outlined above in connection with the form of core shown in FIGS. 2 and 3. In making a tree having a relatively thick trunk, preferably I mold the limbs or branches 56, 58 and 60 individually and then apply them to the core 48 by use of solvents or by heat-sealing them at appropriate locations.

Referring now to FIG. 6, I mold the branches of both forms of my dwarf tree such, for example, as the branch 24 with a core 26 of wire or the like. This permits the branch to be bent to any desired twisted shape to simulate the gnarled appearance of an ancient tree. The various twigs or minor branches 32 of the limb 24 are molded integrally with the branch but need not be provided with wire cores. I do, however, provide the twigs 32 and the branch 24 at certain locations with spikes or projections 62 which I use for the application of fruit, foliage, blossoms or the like. It is understood I may use dried twigs of real trees or bushes, if I desire, to form branches.

Referring now to FIGS. 5, 7 and 8, each form of my artificial dwarf tree includes a root section indicated generally by the reference character 64 which is molded from the same material as that of which the core 38 or 48 is made. It is so shaped as to simulate an exposed root section of a tree. I embed a wire 66 in the root section 64 and arrange it with its ends 68 and 70 extending out from the underside of the root section for a reason which will be explained hereinafter. When the root section has been made, I attach it to the open lower end of the core 38 or 48 by heat-sealing it thereto or by using a suitable solvent.

Referring now to FIG. 9, the receptacle 12 in which I mount my artificial dwarf tree has a false bottom 72 surrounded by a lip 74 forming a relatively shallow space for the deposit of earth-simulating material to be described. When I have formed the trunk core to the desired shape and have shaped the branches and have applied the root-simulating section to the trunk core, I next mount the assembly on the tray 12. To achieve this I pass the ends 68 and 70 of the wire 66 through openings 76 and 78 in the false bottom 72 and twist the ends to hold the tree erect or at the desired inclined angle. When the tree has been thus erected I apply a wrapping 80 of a fibrous material, such as cloth or paper or the like, over substantially the entire surface of the trunk core and the branches of the tree. This is done since the bark simulating material will not readily adhere to the synthetic resin hollow trunk.

When the structure thus far built up has been wrapped and mounted on the false bottom 72 of the pot 12 in the manner described, I next apply simulated bark to the wrapping 80 and apply simulated soil over the false bottom 72. It will be appreciated that, owing to the provision of the false bottom, I need not use as much simulated soil as otherwise would be necessary. I form the bark material 82 from sawdust, fuller's earth, sand or any other suitable finely divided material which either has an appropriate natural color or which may be dyed to an appropriate color. I mix this material with an adhesive such, for example, as casein glue, water-soluble glue or any other suitable adhesive to form a putty. I then apply the putty over the wrapping 80 in any convenient manner as by use of a knife or spatula or the like. I mix a similar putty made of smaller grained dyed sawdust to form the earth material 84 and deposit that over the exposed surface of the false bottom 72. While the bark and earth material is still tacky, I dust a simulation of moss 16 over areas of the bark 82 and soil 84. This may be done in any appropriate manner as by sprinkling or brushing shredded green silk or rayon threads or the like in the desired areas while the simulated bark is still tacky.

When these operations have been accomplished, I have successfully simulated the tree and it branches, as well as the surrounding earth and it remains only to apply foliage. It is to be understood also that it may not be necessary to apply the thick putty to the trunk core to simulate a rough bark. That is, in the event that the tree being simulated has a smooth bark, a paint containing a fine pigment or finely comminuted sawdust or fuller's earth may be brushed or rolled onto the core or in some cases may even be sprayed thereon. It is possible also that in the course of molding the core, a roughened surface may be formed which upon the application of paint thereto may simulate ancient bark.

The final step in my process of making an artificial dwarf tree is the application of foliage, needles, blossoms, fruit or cones or the like to the tree. If desired, certain branches may present a bleached denuded appearance. As has been mentioned hereinabove, the twigs 32 and portions of the branches are provided with spikes 63 which facilitate the application of foliage. Referring now to FIG. 11, in the particular example I have shown I apply simulated pine needles 34 carried by a base 86 adapted to be slipped over the spike 62. These pine needles may be formed from a suitably colored plastic material. While I have shown but one row of needles on the base 86, it will be appreciated that more than a single row may be provided. Once the needle cluster 86 or the like has been applied to the spike, I slip a cone simulating or other simulating element 88 over the end of the spike. This element may also be made from any suitable plastic material.

In summary, in practice of my method of making an artificial dwarf tree, where I desire to make a tree having a trunk of relatively small diameter, I form the notches or gaps in the regions 40 and 42 at which I desire to produce bends in the finished trunk in the manner described above. I next bend the core 38 to close the gaps and seal the wall of the core along the lines at which the gaps close. This form of my invention may have integral branches, such as the branches 24, 26, 28 and 30.

To form a relatively larger diameter tree, I assemble generally straight molded sections 50, 52 and 54 with their axes at angles corresponding to the bends and seal them at the junctions by any of the means described. I next apply separate branches 56, 58 and 60. Having thus formed a trunk core of either a small diameter or a large diameter tree having branches, I then apply a root section to the open lower end by heat-sealing or by use of a solvent or the like. This assembly is then secured to the tray false bottom by passing wire ends 68 and 70 through holes 76 and 78 and twisting them together. The tree is then wrapped and the simulated bark and simulated earth are applied. Next, regions of simulated moss are applied and suitable foliage and fruit or cones are assembled.

It will be seen that I have accomplished the objects of my invention. I have provided an artificial dwarf tree which closely resembles a natural dwarf tree. I have provided an artifiical dwarf tree which is relatively inexpensive. My method of making artificial dwarf trees is applicable to an extremely wide range of shapes and configurations and variety of trees. It permits manufacture of artificial dwarf trees in a rapid, expeditious and inexpensive manner.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An artificial dwarf tree assembly including in combination, a trunk comprising a hollow core made up of a plurality of hollow synthetic resin sections joined with an angle to form a trunk, branches each comprising a central core of wire and synthetic resin carried by said wire, said branches being attached to said trunk by said wires, a root simulating member secured to the lower end of said trunk, an elongated flexible member embedded in said root simulating member with the ends extending therefrom, a supporting base having spaced holes therein, said ends passing through said holes and being joined to mount said tree on said base, twigs carried by said branches, a wrapping of flexible material around said trunk and said branches, bark simulating material on said fibrous material and foliage simulating elements carried by said twigs.

2. In a method of making an artificial dwarf tree the steps of, forming a generally straight hollow body of synthetic resin, forming a gap in the wall of said body intermediate the ends thereof, bending said body to close said gap, and sealing said wall along said closed gap to provide a bent trunk.

3. In a method as in claim 2 in which said gap forming step comprises cutting the wall of said body.

4. In a method as in claim 2 in which said body is made of heat sealable material, in which said gap-forming step comprises melting said wall and in which said sealing step is heat-sealing.

5. In a method as in claim 2 in which said sealing step comprises applying a solvent to said wall in the region of said closed gap.

6. In a method as in claim 2 in which said first forming step comprises molding said hollow body.

7. In a method as in claim 2 the step of attaching a root-structure simulating element to the end of one of said sections.

8. In a method as in claim 2 the step of securing branch simulating members to one of said sections.

9. In a method as in claim 2 the step of wrapping said trunk with fibrous material and adhering bark simulating material to said fibrous material.

10. In a method as in claim 2 the step of mounting said trunk in a receptacle.

References Cited

UNITED STATES PATENTS

| 1,829,687 | 1931 | Takiguchi | 161—22 |
| 2,215,130 | 1940 | Nye | 161—28 |
| 3,331,727 | 7/1967 | Lieval et al. | 161—22 |

JACOB H. STEINBERG, Primary Examiner